United States Patent [19]
Whetsel

[11] Patent Number: 5,362,401
[45] Date of Patent: Nov. 8, 1994

[54] METHOD AND APPARATUS FOR CLEANING A FILTER APPARATUS

[75] Inventor: Jackie G. Whetsel, Oregon, Ill.

[73] Assignee: Aqua-Aerobic Systems, Inc., Rockford, Ill.

[21] Appl. No.: 166,102

[22] Filed: Dec. 14, 1993

[51] Int. Cl.⁵ .................. B01D 33/48; B01D 37/00
[52] U.S. Cl. ........................ 210/741; 134/34; 210/107; 210/108; 210/139; 210/393; 210/780; 210/791
[58] Field of Search .................. 210/90, 106, 107, 108, 210/138, 139, 141, 143, 331, 333.01, 393, 394, 406, 408, 411, 741, 780, 791, 797, 798; 134/18, 21, 34, 56 R, 151; 15/319, 320, 322

[56] References Cited

U.S. PATENT DOCUMENTS

| | | | |
|---|---|---|---|
| 2,460,280 | 2/1949 | Finney | 210/393 |
| 2,932,402 | 4/1960 | Logue et al. | 210/393 |
| 3,954,613 | 5/1976 | Worlidge | 210/108 |
| 4,090,965 | 5/1978 | Fuchs | 210/784 |
| 4,639,315 | 1/1987 | Fuchs | 210/333.1 |
| 5,039,347 | 8/1991 | Hindstrom et al. | 210/393 |

*Primary Examiner*—Joseph W. Drodge
*Attorney, Agent, or Firm*—Vernon J. Pillote

[57] ABSTRACT

A method and apparatus for cleaning a filter apparatus in which liquid influent is passed through web filter material on a rotatable filter frame into a filter effluent compartment and wherein the filter material is intermittently backwashed during a filter time by a suction device at an outer side of the filter material which draws filtered liquid from filtered effluent compartment in a backwash direction through the filter material, and wherein the filter material on the filter frame is subjected to a wash operation during a wash time by directing a high pressure liquid spray at one side of the filter material. The pressure in the suction device during backwashing is monitored, and the wash operation is initiated after the pressure in the suction device reaches a preselected sub-atmospheric pressure.

14 Claims, 3 Drawing Sheets

METHOD AND APPARATUS FOR CLEANING A FILTER APPARATUS

BACKGROUND OF THE INVENTION

In filter apparatus of the type disclosed in U.S. Pat. Nos. 4,090,965 and 4,639,315, web type filter material such as a filter cloth is mounted on a rotatable filter frame to form one or more enclosed filter effluent compartments on the rotatable frame. During filtering, liquid influent containing suspended solids is passed into an influent compartment and flows in a filter direction through the filter material into the filter effluent compartment for discharge to an outlet. Intermittent backwashing of the filter material is effected by moving the filter material past a suction head positioned to engage an outer side of the filter material and which is operative to draw filtered liquid from the filter effluent compartment through the filter material in a direction opposite the filter direction, to remove and discharge the entrapped solids with the backwash water. In general, a backwash step is initiated either by a timer at periodic intervals or by sensing a preselected rise in liquid level in the tank as an indication that the filter web is becoming clogged.

There are some solids which cannot be removed from the filter material by backwashing alone and solids continue to build up in the filter material and shorten the time interval between successive backwashings. The above patents also disclose a high pressure spray wash for washing the filter material after a number of backwash operations. The high pressure spray wash includes spray nozzles disposed either inside or outside the filter effluent compartments and arranged to direct high pressure liquid spray at one side of the filter material. The high pressure spray wash has been found effective to remove some of the solids that are not removed in the backwashing steps and thus increase the operational life of the filter material. The high pressure spray wash cannot be effected while the area of the filter material being washed is submerged in liquid and it is necessary to interrupt filtering during the high pressure wash. In the prior filter apparatus of this type, the high pressure wash operation was initiated either by a timer, based on an estimate of the appropriate time interval between high pressure washes, or manually at a time selected by a filter operator. However, the rate of influent flow to the filter and the composition of the influent varies over a wide range with time in the same installation and it has not been possible to accurately estimate the time at which the filter material should be subjected to a high pressure wash operation.

SUMMARY OF THE PRESENT INVENTION

In accordance with the present invention, the subatmospheric pressure in the suction nozzle during backwashing of the filter material is monitored and a high pressure wash operation is initiated after the pressure in the suction nozzle reaches a preselected sub-atmospheric pressure. The system can be arranged to initiate the high pressure wash operation at the time the pressure in the suction device reaches the preselected sub-atmospheric pressure. However, since the filter operation must be stopped during high pressure wash, it is preferable to delay initiating the high pressure wash until a preselected time of day after the suction device reaches a preselected sub-atmospheric pressure, so that the high pressure wash can be done during a low flow period of the day.

It is also contemplated that the interval or time between high pressure washes be monitored and a signal produced and/or stored when the interval between successive high pressure washes is less than a preselected minimum to indicate that the filter material should be replaced or removed for cleaning.

DETAILED DESCRIPTION

The present invention relates a method and apparatus for cleaning a filter apparatus of the type disclosed in U.S. Pat. Nos. 4,090,965 and 4,639,315. In general, such filter apparatus include a rotatable filter frame 10 having a web type filter material F such as a filter cloth on some surfaces of the rotatable filter frame to form one or more enclosed filter effluent compartments on the filter frame. As disclosed in the aforementioned patents, the web filter material can be mounted on the ends of the filter frame or on the periphery of the filter frame, or both if desired. In the embodiment illustrated, the filter material F is mounted on generally radially extending ends of the rotatable frame and such filter apparatus are sometimes referred to as a disk-type filter apparatus. When the filter material is mounted on the outer periphery of the rotary frame as also disclosed in the aforementioned patents, the rotary frame is formed with a greater axial length and such filter apparatus are sometimes referred to as drum-type filter apparatus. As used herein, the phrase rotatable filter frame is intended to include rotatable filter frames having filter material on the ends or on the periphery or both.

Figure 1:
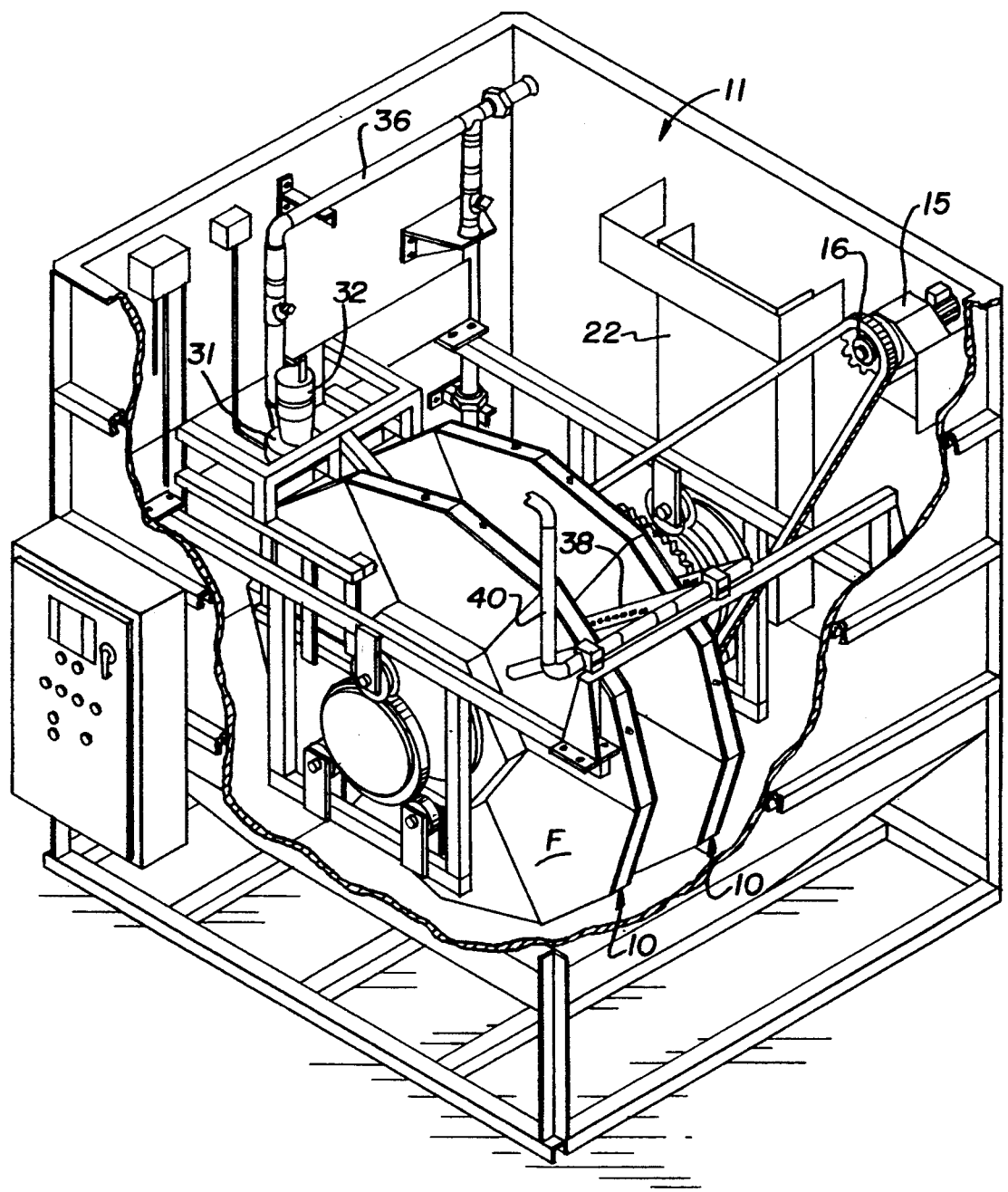
FIG. 1 is a perspective view of a filter apparatus with parts broken away to show details of construction.
Figure 3:
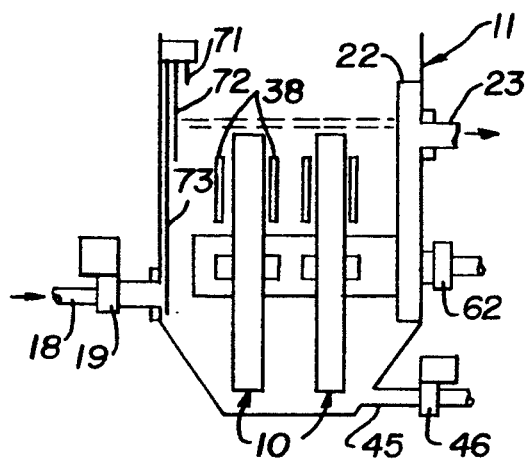
FIG. 3 is a diagrammatic vertical sectional view through the filter apparatus illustrating the apparatus in a filter mode.

The filter frames are preferably mounted for rotation about a generally horizontal axis within the tank 11 and, as shown in FIG. 1, are driven by a motor 15 through a sprocket and chain drive 16. During the normal filter run as shown in FIG. 3, liquid influent containing suspended solids is supplied by gravity feed or from a pump (not shown) to an influent supply line 18 controlled by a valve 19 and the liquid phase of the influent passes through the web filter material F on the drums into the filter effluent compartment while the solids are filtered out and deposited on outer side of the filter media. The rotatable filter frames are mounted on a hollow support 21. Filtered effluent from the interior of the filter effluent compartments flows through hollow support 21 and into a riser conduit 22 having a filtered effluent outlet 23 adjacent its upper end and at a level adjacent the uppermost portions of the rotatable filter frame.

Figure 4:
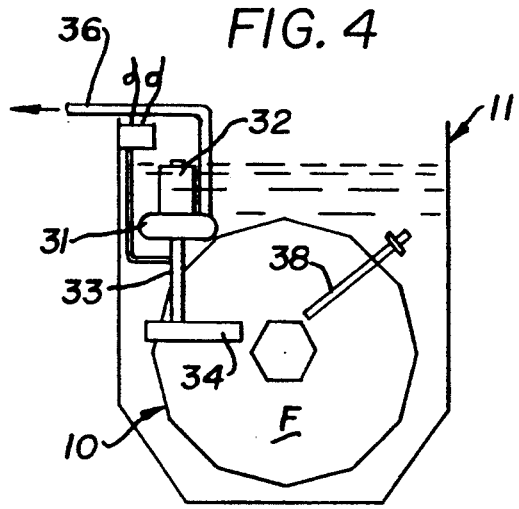
FIG. 4 is a diagrammatic vertical sectional view through the filter apparatus on a plane transverse to the plane of FIG. 3, and illustrating the apparatus in a backwash mode.

The web filter material on the filter frames is backwashed by a backwash pump 31 driven by a motor 32. The backwash pump has an inlet connected through a conduit 33 to one or more suction heads 34. In the apparatus shown in which the rotatable filter frame 10 have web filter media on the ends, a suction head 34 is provided at each radial face of the filter frame. When filter material is mounted on the periphery of the filter frame, a suction head would be arranged to engage the filter material on the periphery of the filter frame. One backwash pump can be arranged to backwash the filter material F on both ends of one or more filter frames. When the backwash pump is actuated, the suction heads draw filtered water from inside the filter effluent compartments in a direction opposite the filter direction, and the backwash pump discharges the entrapped solids with the backwash water to drain through a drain conduit 36 as shown in FIG. 4. The suction heads 34 are preferably yieldably urged into engagement with the surface of the filter material on the filter frames as by springs (not shown) and the filter material is preferably a flexible material such as woven cloth which can be drawn into contact with the suction head when the backwash pump is actuated.

Figure 5:
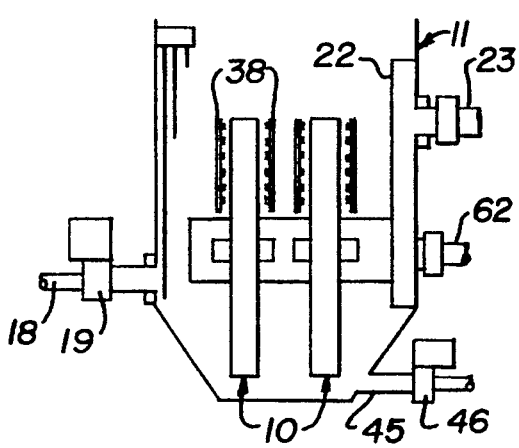
FIG. 5 is a diagrammatic vertical sectional view illustrating the filter apparatus in a spray wash mode.
Figure 6:
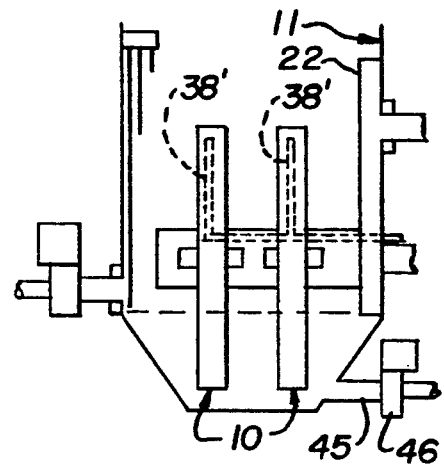
FIG. 6 is a diagrammatic vertical sectional view illustrating a modified form of the filter apparatus.

There are some solids which are not removed from the filter material by backwashing alone and solids continue to build up in the filter media. The filter apparatus disclosed in the aforementioned '965 and '315 patents, also include a high pressure spray wash for washing the filter material, usually after a number of backwash operations. The high pressure spray wash includes spray nozzles 38 arranged to direct the high pressure liquid spray against a surface of the filter material, and a high pressure pump 39 having an outlet connected through distributor pipes 40 to the spray nozzles. In the embodiment illustrated in FIG. 5, the spray nozzles 38 are disposed outside the filter effluent compartments, with one set of spray nozzles at each radial end of the filter frame to direct sprays against the outer surface of the filter material. As disclosed in the aforementioned '965 patent. The spray nozzles can also be located inside the filter effluent compartments as indicated at 38' in FIG. 6 and arranged to direct sprays in opposite directions against the inner faces of the filter material. Some of the suspended solids in the influent settle by gravity to the bottom of the tank before or after adhering to the drum and some other solids are dislodged from the filter material on the filter frame structure during backwashing and also during spray washing, and settle to the bottom of the tank. Sludge from the bottom of the tank is removed at intervals through a sludge outlet 45 and sludge pump 46 driven by a motor 47.

Figure 2:
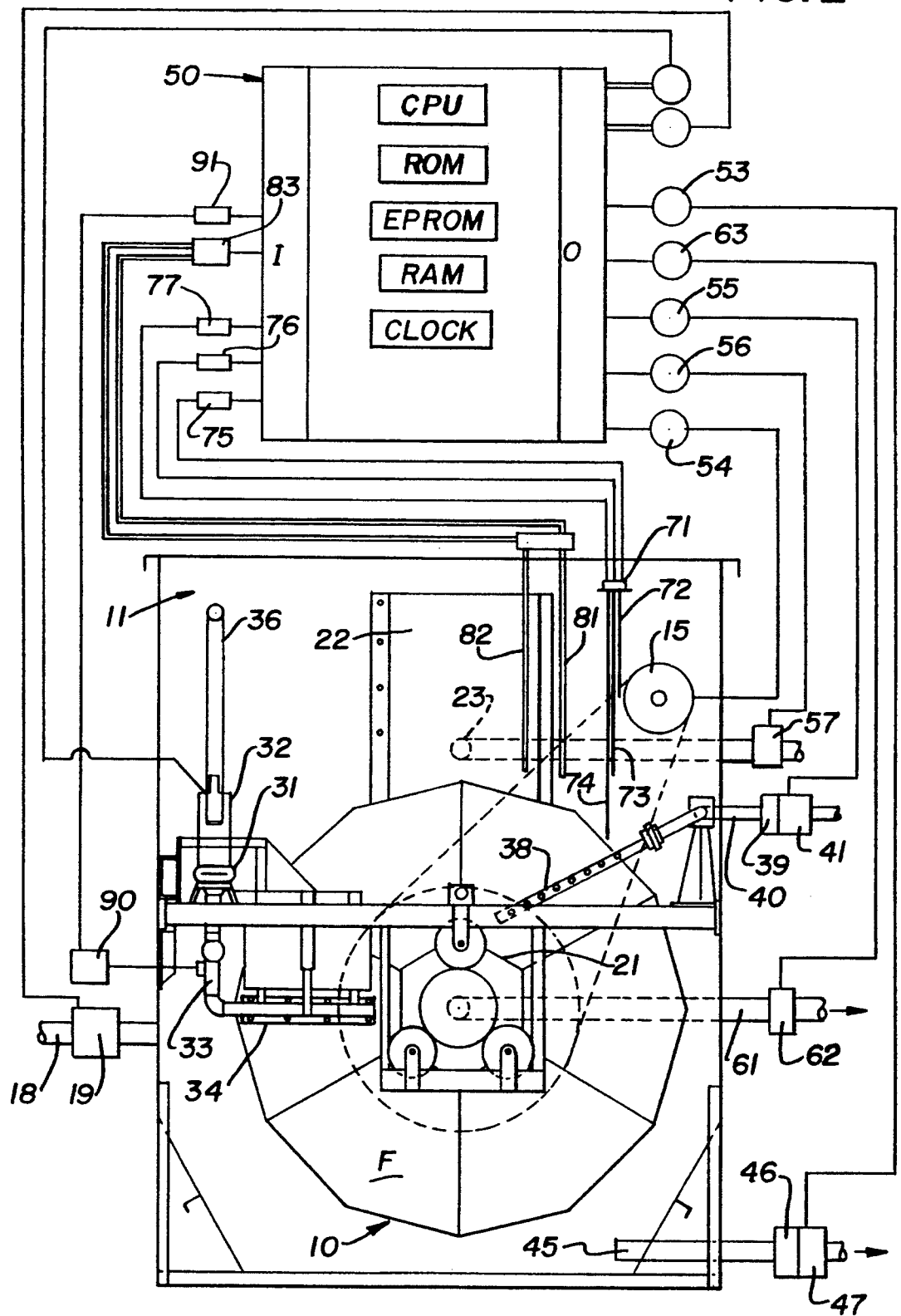
FIG. 2 is a diagrammatic vertical sectional view through the filter apparatus with the controls illustrated schematically.

Operation of the filter apparatus is preferably controlled by a microprocessor of the type which can be programmed to initiate and time certain functions such as sludge wasting, backwashing, prewash, wash and rinse phases of a filter cycle and can also respond to certain input signals to override the default times for different phases of the filter cycle. As shown in FIG. 2, the microprocessor 50 is connected through an output relay 53 to the drive motor 47 for sludge pump 46. The microprocessor is also arranged to operate relay 54 that controls energization of the rotary filter frame drive motor 15, and a relay 55 that controls energization of the drive motor 41 for the high pressure wash pump 39. Microprocessor also controls actuation of a relay 56 for operating a valve 57 in the filtered effluent discharge line 23. In order to effectively spray wash the filter material on the filter frame, it is necessary to lower the liquid level adjacent the filter frame to a level below the spray nozzles 38. A wash drain line 61 is connected to communicate with the filtered effluent outlet at a level below the spray nozzles, and flow through this line is controlled by a valve 62 operated by a relay 63.

Figure 7:
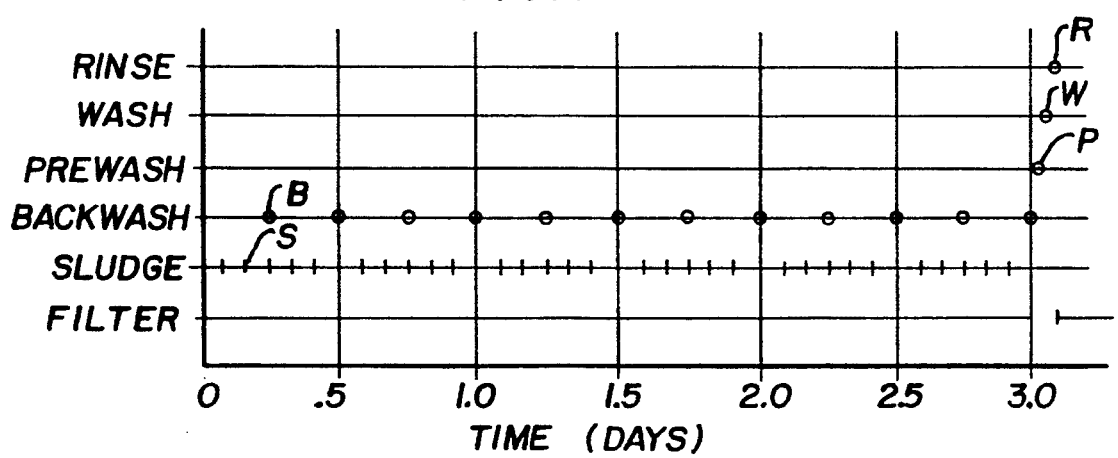
FIG. 7 is a graph illustrating a set of programmed default times for the filter rinse, wash, prewash, backwash and sludge removal or sludge washing phases of the filter cycles.

The microprocessor can be programmed to set default times for the sludge removal, backwash, prewash, wash and rinse phases of the filter cycle and FIG. 7 is a timing diagram illustrating a set of default times which could be used in some installations, it being understood that the default times could vary in different installations depending on the influent flow rate, influent composition and the like. While the apparatus is in a filter mode indicated by the line labeled "Filter" in FIG. 7, the influent valve 19 is open and influent is supplied by gravity or by an influent pump (not shown) to the tank at a rate to maintain the liquid level above the rotary filter frames. Sludge removal can occur at any time during the filter time and is effected by operating a sludge discharge control 47 such as a valve or pump for a short time for example 20 seconds at periodic intervals. The microprocessor is preferably programmed to set default times for sludge removal, for example every two hours as indicated by the marks S in FIG. 7 on the line designated "Sludge". Backwashing is effected by energizing the backwash pump drive motor 32 and by also energizing the drive motor 15 to rotate the rotary filter frames past the suction heads. Backwashing can be effected at any time during the filter time and the microprocessor is advantageously programmed to set default times for backwashing at preselected times, for example every six hours as indicated by the marks B on the line designated backwash in FIG. 7, with each backwashing operation continuing for a short time sufficient to allow the drum to rotate through at least one revolution past the backwash heads 34. The microprocessor is also preferably programmed to initiate a high pressure wash at a preselected default time, for example every three days at a predetermined low flow time of day. The high pressure spray is not effective if it is submerged and it is therefore necessary to lower the liquid to a level below the high pressure spray nozzles prior to the wash operation. This is indicated by the mark P on the line designated "Prewash" in FIG. 7 and is effected by stopping the influent pump 19 and opening the valve 62 for a time sufficient to allow the influent in the tank to drain down to a level below the spray nozzles 38. The microprocessor proceeds to the high pressure wash phase as indicated by the mark W on the line designated "Wash" in FIG. 7, by energizing the motor for the high pressure spray pump 39 for a short time at least sufficient to allow the rotary filter frames to rotate through at least one revolution past the spray nozzle. At the end of the high pressure wash phase, the microprocessor proceeds to the rinse phase as indicated by the mark designated R on the "Rinse" line in FIG. 7, in which influent valve 19 is opened; the influent pump (if provided) is operated, and the discharge valve 62 is opened for a short time, for example two minutes, to rinse the filter material on the filter frames and refill the tank. The apparatus is then returned to its filter phase and the next programmed filter cycle is started.

The rate of influent flow and the composition of the influent vary widely from time-to-time and it is has heretofore been the practice to sense the rise in liquid level in the tank as an indication that the filter was becoming clogged and to operate the backwash mechanism when the liquid in the tank rose to a preselected level. As shown in FIG. 2, a multi-probe type liquid level sensor 71 is mounted in the tank and includes an upper level probe 72, an intermediate level probe 73 and a lower level probe 74. Probes 72, 73 and 74 are connected to liquid level sensors 75, 76 and 77 respectively connected to the input circuit of the microprocessor. Upper level probe 72 is an emergency or high water electrode and is operative through sensor 75 and microprocessor 50 to initiate a backwash cycle. Intermediate probe 73 senses when the water level is adjacent the top of the rotary filter frames and is operative through sensor 76 to interrupt the automatic mode and protect the pumps from operating without water. Probe 74 senses when the water level is sufficiently low to allow high pressure spray, and is operative through sensor 77 to initiate operation of the high pressure spray apparatus.

Because of variations in the influent flow rate, sensing the liquid level in the tank alone may not provide a reliable indicator of when it is time to start a backwash cycle. In accordance with one aspect of the present invention, provision is made of sensing the differential between the level of the liquid in the tank and the level of the liquid at the effluent outlet 23. This is preferably effected by bubbler-type sensing device including one bubbler tube 81 that extends into the tank and a second bubbler tube 82 that extends into the effluent riser 22. The bubbler tubes are connected to a differential pressure sensor 83 which supplies a signal to the microprocessor when the liquid in the tank rises to a preselected level above the liquid level at the effluent outlet 23, to initiate a backwash cycle. The bubbler-type differential pressure sensor may, for example, be of the type manufactured by a Computer Instruments Corporation of Westbury, N.Y., Model 7700.

In general, the bubbler forces gas through the two dip tubes 81 and 82 into the liquid. The pressure in the two lines is equal to the hydrostatic pressure at the exit points of the tube and the differential pressure sensor 83 is connected to the feed lines and measures the difference in the pressure signals from the exits of the two dip tubes. The ends of the dip tubes are positioned at the same level and the measured differential pressure is a direct indication of the difference in the liquid levels.

As previously described, the microprocessor can be programmed to initiate a high pressure wash cycle at a preselected time and preferably at a low flow time of day. However, in any installation, the rate of flow and the composition of the liquid influent in solids and in chemical composition, can vary from hour to hour, day to day, and season to season. Since the filter operation must be stopped during the high pressure wash operation, it is desirable on one hand to maximize the interval between high pressure washes. On the other hand, if the interval between high pressure washes is too long, the high pressure wash may be insufficient to properly clean the filter web so that the latter progressively becomes more and more clogged as time goes on.

In accordance with the present invention, means are provided for sensing the vacuum in the suction heads during the backwashing operations and for initiating the high pressure wash operation after the pressure in the suction device reaches a preselected sub-atmospheric pressure having a vacuum or negative gage pressure somewhat higher than that which would occur when backwashing of new filter material. For this purpose, a vacuum sensing device 90 is connected through a tube to the line 33 between the vacuum nozzles 34 and the vacuum pump 31 and the vacuum sensing device is connected through conductors to a sensing unit 91 that is operative, when the suction of the backwash pump reaches the preselected sub-atmospheric pressure, to transmit a wash cycle initiate signal to the microprocessor 50. For example, if the pressure sensor senses a sub-atmospheric pressure of about 75 to 125 mm of Hg. during backwashing of new filter material, then the sensing unit 91 could be set to produce a wash cycle initiate signal at a higher vacuum or negative gage pressure such as 400 to 450 mm Hg. The microprocessor can be programmed to initiate a wash cycle promptly after the vacuum in the suction heads reach the preselected sub-atmospheric pressure, or within a predetermined time delay thereafter. However, since the filtering operation must be interrupted during the high pressure wash, the microprocessor is advantageously programmed to initiate a wash operation at a preselected low flow time of day after the suction device produces the wash cycle initiate signal. As previously described, the wash operation includes a prewash phase in which the liquid adjacent the filter drum is lowered to a level below the wash nozzles; a wash phase during which high pressure liquid is sprayed through the nozzles 38 while the filter drums are rotated past the nozzles, and a rinse phase during which the spray wash is stopped and the liquid level in the tank is returned to its normal level.

While the timing diagram in FIG. 7 represents default times for the sludge, backwash and wash operations, it is deemed apparent that sensing the rise of the liquid level in the tank relative to the liquid level in the effluent riser 22, may initiate backwash operations at time intervals shorter than the uniform time intervals indicated at B in the graph and that the time intervals between the backwashing operations may increase or decrease depending on the rate of influent flow and the age of the filter cloth. Further, although the timing diagram indicates initiation of a wash operation at a preselected time, initiation of the wash operation when the vacuum pressure in the suction devices reaches a preselected sub-atmospheric pressure, will normally be shorter than the time interval between successive washes based upon the default value indicated in FIG. 7. The vacuum level in the suction heads measured during the backwash operation is indicative of the degree to which the filter material is clogged or loaded with contaminants that are not being effectively removed by the vacuum backwashing, and is a more reliable indication that it is time for a high pressure wash to further remove material in the filter webs.

Initiating backwash operation whenever the head loss in the forward filter direction reaches a preselected level, and thereafter initiating a high pressure wash cycle when the suction pressure during backwashing reaches a preselected value, minimizes the time that the filter is not in the filter mode and extends the operational life of the web filter material. However, some contaminants are not completely removed during the wash operations and the microprocessor is programmed to measure the time interval between successive wash operations and to produce and store a signal such as visual signal when the time interval between successive wash operations is less than a preselected minimum, indicating it is time to change the web filter material on the filter frame.

I claim:

1. In a method of cleaning a filter apparatus wherein, during a filter time in a filter cycle, liquid influent is passed in a filter direction through filter material on a rotatable filter frame into a filter effluent compartment to an outlet, and wherein the filter material is intermittently backwashed during the filter time by operating a suction device outside of the filter frame to draw filtered liquid from the filter effluent compartment in a backwash direction through the filter material, and wherein the filter material on the frame is subjected to a wash operation during a wash time in the filter cycle by directing a high pressure liquid spray at one side of the filter material, the improvement comprising: monitoring the pressure in the suction device during backwashing of the filter material, and initiating said wash operation after the pressure in the suction device reaches a preselected sub-atmospheric pressure.

2. The method of claim 1 wherein the wash operation is started within a preselected time after the pressure in the suction device reaches said preselected sub-atmospheric pressure.

3. The method of claim 1 wherein the wash operation is started at a preselected time of day after the pressure in the suction device reaches said preselected sub-atmospheric pressure.

4. The method of claim 1 including sensing the time intervals between successive wash operations and producing a signal indicating it is time to change the filter medium on the frame when the time between successive wash operations is less than a preselected minimum.

5. The method of claim 1 including sensing the head differential between the influent compartment and the outlet of the effluent outlet, and backwashing the filter material when the head differential reaches a preselected value.

6. The method of claim 1 including rotating the filter frame relative to the suction device during backwashing.

7. The method of claim 1 wherein the filter frame is immersed in the liquid influent in the influent compartment during the filter time and the wash operation includes lowering the liquid level below an upper side of the filter frame before directing the high pressure liquid spray at said one side of the filter material, and rotating the filter frame relative to the high pressure liquid spray.

8. In a filter apparatus including a rotatable filter frame having filter material thereon and defining a filter effluent compartment inside the filter frame, means providing an influent compartment outside the filter frame, inlet means for supplying liquid containing suspended solids to the influent compartment, a filtered effluent outlet communicating with the filter effluent compartment, backwash means including a suction device outside of the filter frame for drawing liquid from the filter effluent compartment in a backwash direction through the filter material, means for intermittently operating said backwash means, and spray wash means including spray nozzles operable to direct high pressure liquid spray at one side of the filter material, the improvement comprising: means for monitoring the pressure in the suction device during operation of the backwash means, and control means for operating the spray wash means after the pressure in the suction device reaches a preselected sub-atmospheric pressure.

9. A filter apparatus according to claim 8 wherein the control means is arranged to start operation of the spray wash means at a preselected time interval after the pressure in the suction device reaches said preselected sub-atmospheric pressure.

10. A filter apparatus according to claim 8 wherein the control means is arranged to start operation of the spray wash means at a preselected time of day after the pressure in the suction device reaches said preselected sub-atmospheric pressure.

11. A filter apparatus according to claim 8 including means for sensing the time intervals between successive operations of the spray wash means and for producing a signal indicating that it is time to change the filter material on the filter frame.

12. A filter apparatus according to claim 8 including means for sensing a head differential between the influent compartment and the outlet of the effluent compartment, and means for operating the backwash means in response to the mean for sensing.

13. A filter apparatus according to claim 8 including means for rotating the filter frame relative to the suction nozzle.

14. A filter apparatus according to claim 8 wherein the spray nozzles of the spray wash means are arranged to direct the liquid spray at an upper portion of the filter frame, the control means including means for rotating the filter frame relative to the spray wash means.

* * * * *